(No Model.)
F. COLLINS.
ATTACHMENT FOR FOCUSING PHOTOGRAPHIC CAMERAS.
No. 341,885. Patented May 18, 1886.
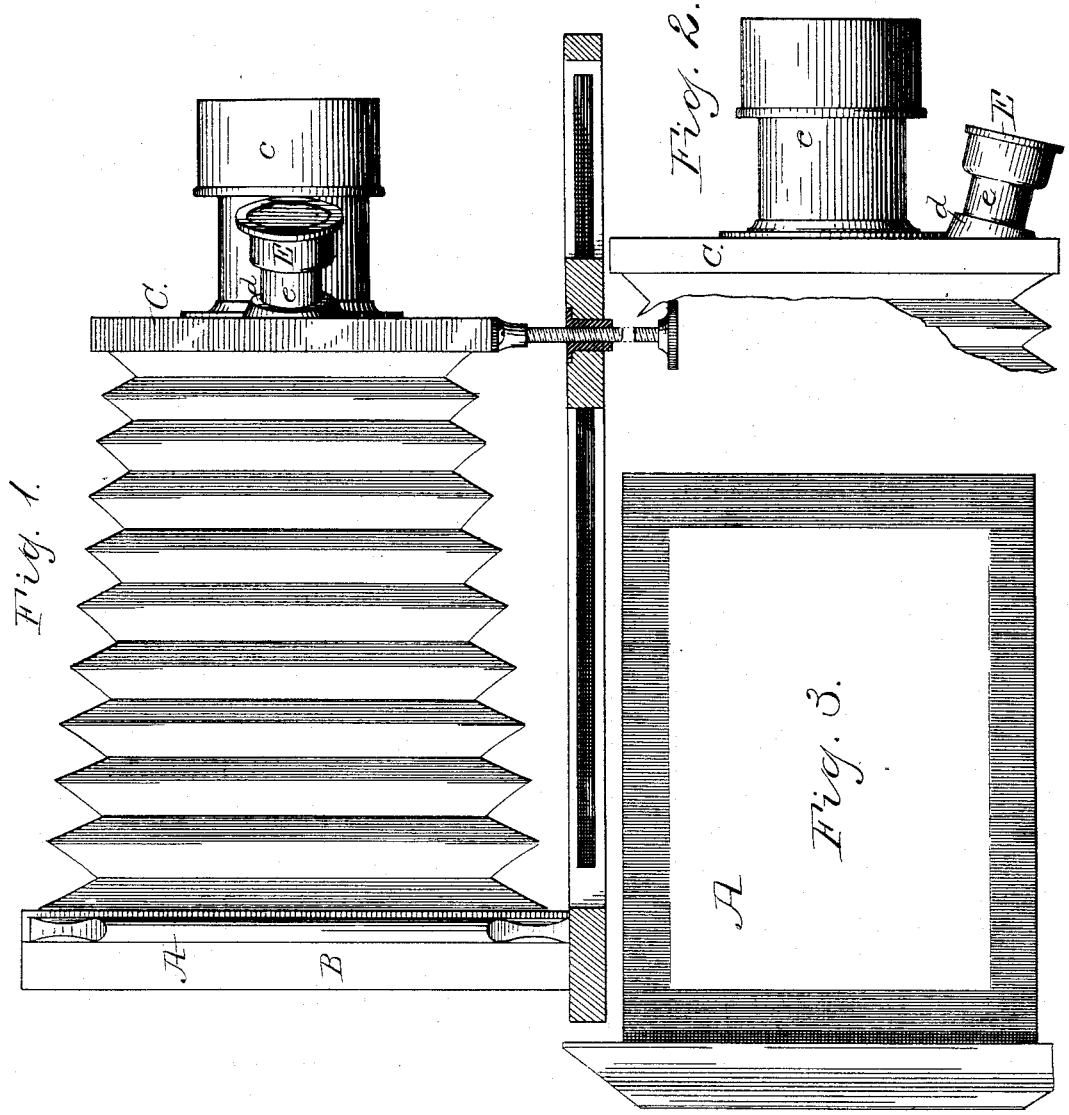
Witnesses:
J. A. Hagstrom.
H. F. Wackendorff.
Inventor:
Frederick Collins
By James H. Coyne
attorney
N. PETERS, Photo-Lithographer, Washington, D. C.

UNITED STATES PATENT OFFICE.

FREDERICK COLLINS, OF ST. JOSEPH, MICHIGAN.

ATTACHMENT FOR FOCUSING PHOTOGRAPHIC CAMERAS.

SPECIFICATION forming part of Letters Patent No. 341,885, dated May 18, 1886.

Application filed July 14, 1885. Serial No. 171,595. (No model.)

*To all whom it may concern:*

Be it known that I, FREDERICK COLLINS, of St. Joseph, in the county of Berrien and State of Michigan, have invented certain new and useful Improvements in Attachments for Focusing Photographers' Cameras; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide new and improved means for focusing photographers' cameras, which dispenses with the transparent focusing-screen and darkening-cloth, and enables the operator in the brightest of lights to accurately focus the camera.

In the drawings, Figure 1 is a side elevation of my invention, showing the supporting-plate or camera-rest in cross-section. Fig. 2 is a detail view showing a plan view of the lens and focusing-glass; and Fig. 3 is a detail view showing a focusing surface on the face of a slide.

Heretofore when focusing photographers' cameras a screen of transparent silk or ground glass has been used which receives the reflection of the lens, and is visible to operator only when he has carefully enveloped his head and the rear end of the camera (in which said transparent screen is generally placed) in a focusing-cloth.

In my invention, as the operator does not focus from the rear of the apparatus, the transparent screen is dispensed with, and there being no exposure to light, except through the lens, there can be no use for the focusing-cloth.

In the place of a transparent screen I substitute on the exposed side of a slide, A, in the slide-box B, a white surface, either made by painting the same or pasting thereto a thin sheet of white paper, and in order to focus the camera intelligently and accurately I make in the head-frame C a small aperture, d, which is located just to one side of the lens c, affixed to said frame C. By peeping through this aperture the object can be properly focused on the white surface in line with and in rear of the lens. When the eye is withdrawn from this focusing-aperture d, it is closed in any suitable manner, either by a shutter, blind, cap, or otherwise, and the slide being withdrawn sufficiently from before the sensitive plate, the negative is taken. In order, however, that the operator's nose, or other prominent facial feature, may not interfere with getting his eye so close to aperture d as to prevent the light entering the dark chamber, I consider it advisable (although not absolutely necessary) to secure concentric thereto and leading therefrom, a rubber or flexible tube, e, and to place a magnifying-glass in a suitable head, E, secured to the end thereof, so as to bring the reflection nearer the eye. It will be understood that the opening to this magnifying-glass is covered the same as aperture d would be when not in use.

I am aware that Letters Patent have been granted in this and foreign countries for camera-obscuras and solar cameras which have openings in them through which the image reflected by the lens can be seen; but these are all different from my invention, which consists of the use of such opening in photographers' cameras together with a magnifying-glass—if desirable a flexible tube, &c., in conjunction therewith—as hereinbefore described.

What I claim is—

1. In a photographer's camera, the combination, with the head-frame C, having an aperture, d, therein contiguous to the lens, and a flexible tube leading therefrom and said lens, of a light-colored or white surface in rear of and in line with said lens.

2. In a photographer's camera, the combination, with the frame C, having an aperture, d, therein, a magnifying-glass, and the lens c, of a light or white surface in the dark chamber, in rear of and in line with said lens.

In testimony that I claim the foregoing as my own I hereunto affix my signature in presence of two witnesses.

FREDERICK COLLINS.

Witnesses:
EDWARD W. SCHIRACH,
FRANK D. THOMASON.